United States Patent [19]

Ohtani

[11] Patent Number: 5,822,407
[45] Date of Patent: Oct. 13, 1998

[54] COMMUNICATION APPARATUS CONTROLLED BY A REMOTE CONTROL SIGNAL

[75] Inventor: Atsushi Ohtani, Tokyo, Japan

[73] Assignee: Canon Kabushiki Kaisha, Tokyo, Japan

[21] Appl. No.: 649,463

[22] Filed: May 17, 1996

[30] Foreign Application Priority Data

May 26, 1995 [JP] Japan .................................. 7-152433
May 7, 1996 [JP] Japan .................................. 8-137660

[51] Int. Cl.$^6$ ........................... H04M 1/64; H04M 11/00
[52] U.S. Cl. ............................................. 379/100; 379/67
[58] Field of Search ........................... 379/100, 88, 67, 379/77, 105, 102

[56] References Cited

U.S. PATENT DOCUMENTS

| | | | |
|---|---|---|---|
| 5,490,210 | 2/1996 | Sasso | 379/100 |
| 5,513,253 | 4/1996 | Yoshida et al. | 379/100 |
| 5,526,420 | 6/1996 | Watanabe et al. | 379/100 X |
| 5,544,234 | 8/1996 | Terajirua et al. | 379/100 |
| 5,579,377 | 11/1996 | Rogers | 379/74 |

*Primary Examiner*—Thomas W. Brown
*Attorney, Agent, or Firm*—Fitzpatrick, Cella, Harper & Scinto

[57] ABSTRACT

In a communication apparatus remotely controlled by a remote control signal from a near terminal and a remote control signal from a remote terminal, when amplifying a received signal by an amplifier and detecting a remote control signal based on the amplified signal, the amplification degree of the amplifier is changed between when receiving a remote control signal from the near terminal and when receiving a remote control signal from the remote terminal.

12 Claims, 8 Drawing Sheets

COMMUNICATION APPARATUS CONTROLLED BY A REMOTE CONTROL SIGNAL

BACKGROUND OF THE INVENTION

1. Field of the Invention

This invention relates to a communication apparatus remotely controlled by a remote control signal.

2. Description of the Related Art

A conventional apparatus of this kind is, for example, a facsimile apparatus that has a first remote control function of recording a message during the absence of the operator, which function can be remotely controlled by a remote control signal, such as a DTMF (dual tone multifrequency) signal or the like, from a public telephone line.

When one telephone line is utilized for both facsimile communication and conversation, a telephone set is connected to the facsimile apparatus, and the telephone line is selectively switched between a facsimile communication unit (modem) and the telephone set. Some facsimile apparatuses have a second remote control function called the remote call reception function. In this function, when a call has been received from a telephone line, the operator responds through a telephone set. When the communication partner (calling side) has indicated that he wants to perform facsimile communication, the operator transmits a remote control signal, comprising a DTMF signal, by operating a ten-digit keypad (dialing key) of the telephone set to switch the telephone line from the telephone set to the facsimile communication unit, and thereafter facsimile communication is started.

When a single facsmile apparatus has the above-described two kinds of remote control functions, the remote control signals (tone signals) received by the facsimile apparatus comprise a tone signal transmitted from a remote location via a public telephone line, and a tone signal transmitted from a telephone set connected to the facsimile apparatus.

Detection of a remote control signal (tone signal) in a conventional facsimile apparatus is performed by amplifying a tone signal from a primary-side-secondary-side separation circuit, such as a transformer or the like, with a constant amplification degree by an amplifier, and inputting the amplified signal to a tone-signal detection circuit.

In a recent system which does not have an analog power supply, for example, having a voltage of +12 V, and which has instead only a power supply having a voltage of 5 V, the dynamic range of a transmittable signal is small. A tone signal input from such a system (remote system) has a power level of about –5 dbm to –40 dbm. If the gain for detection of an input tone signal is set to such a value that an input signal having the maximum level is not saturated, it is difficult to detect a low-level signal from a remote terminal due to noise and the like. On the other hand, if the gain is set to such a value that a low-level signal is accurately detected, a high-level tone signal input from a telephone set connected, for example, to a sub-telephone terminal of an information communication terminal is distorted after being amplified, and therefore it is difficult to detect the tone signal.

The dynamic range of a typical DTMF-signal receiver is about 30 dB. Hence, it is difficult to detect tone signals within a range between –5 dbm and –40 dbm in consideration of the performance of a receiver.

SUMMARY OF THE INVENTION

The present invention has been made in consideration of the above-described problems.

It is an object of the present invention to improve a communication apparatus remotely controlled by a remote control signal.

It is another object of the present invention to provide a communication apparatus which can appropriately detect both a remote control signal from a remote terminal and a remote control signal from a near terminal.

It is still another object of the present invention to provide a communication apparatus in which, when amplifying an input signal and supplying a remote-control-signal detection unit with the amplified signal, both a high-level input signal and a low-level input signal can be detected by controlling the amplification degree for the signal in accordance with the level of the input signal.

According to one aspect, the present invention which achieves these objectives relates to a communication apparatus capable of being controlled by a remote control signal from a near terminal and a remote control signal from a remote terminal, comprising amplifier means for amplifying a received signal. An amplification degree of the amplifier means is controllable. The apparatus also comprises first detection means for detecting the remote control signal on the basis of the signal amplified by the amplifier means, second detection means for detecting whether the apparatus is in a first state of receiving the remote control signal from the near terminal or in a second state of receiving the remote control signal from the remote terminal, and control means for controlling the amplification degree of the amplifier means in accordance with a result of the detection by the second detection means.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

Preferred embodiments of the present invention will now be described in detail with reference to the drawings.

In the following embodiments, a description will be provided illustrating a facsimile apparatus remotely controlled by a predetermined DTMF signal (tone signal).

Figure 1:
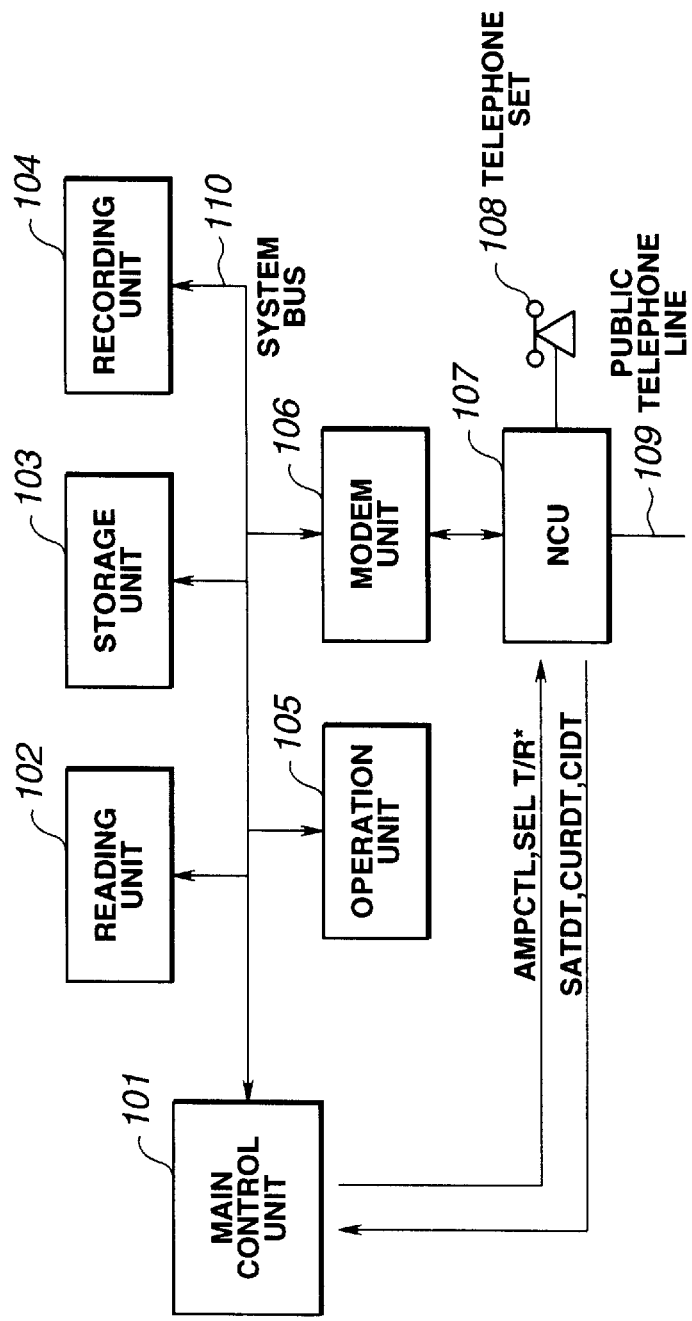
FIG. 1 is a block diagram illustrating the configuration of a facsimile apparatus commonly used for first and second embodiments of the present invention.

FIG. 1 is a block diagram illustrating the configuration of a facsimile apparatus commonly used for the first and second embodiments of the present invention.

In FIG. 1, a main control unit 101 controls the entire facsimile apparatus, and comprises a microprocessor, a ROM (read-only memory) for storing programs for control, a RAM (random access memory) for temporarily storing various kinds of data, and the like.

The main control unit 101 is connected, via a system bus 110, to a reading unit 102 for reading originals, a storage unit 103 for storing image data, a recording unit 104 for recording image data, an operation unit 105 for operating the apparatus, and a modem unit 106 for modulating/demodulating transmitted and received data, and controls these units. The operation unit 105 comprises various kinds of key-input switches, a liquid-crystal display unit and the like. The modem unit 106 has a function of detecting DTMF signals.

Figure 2:
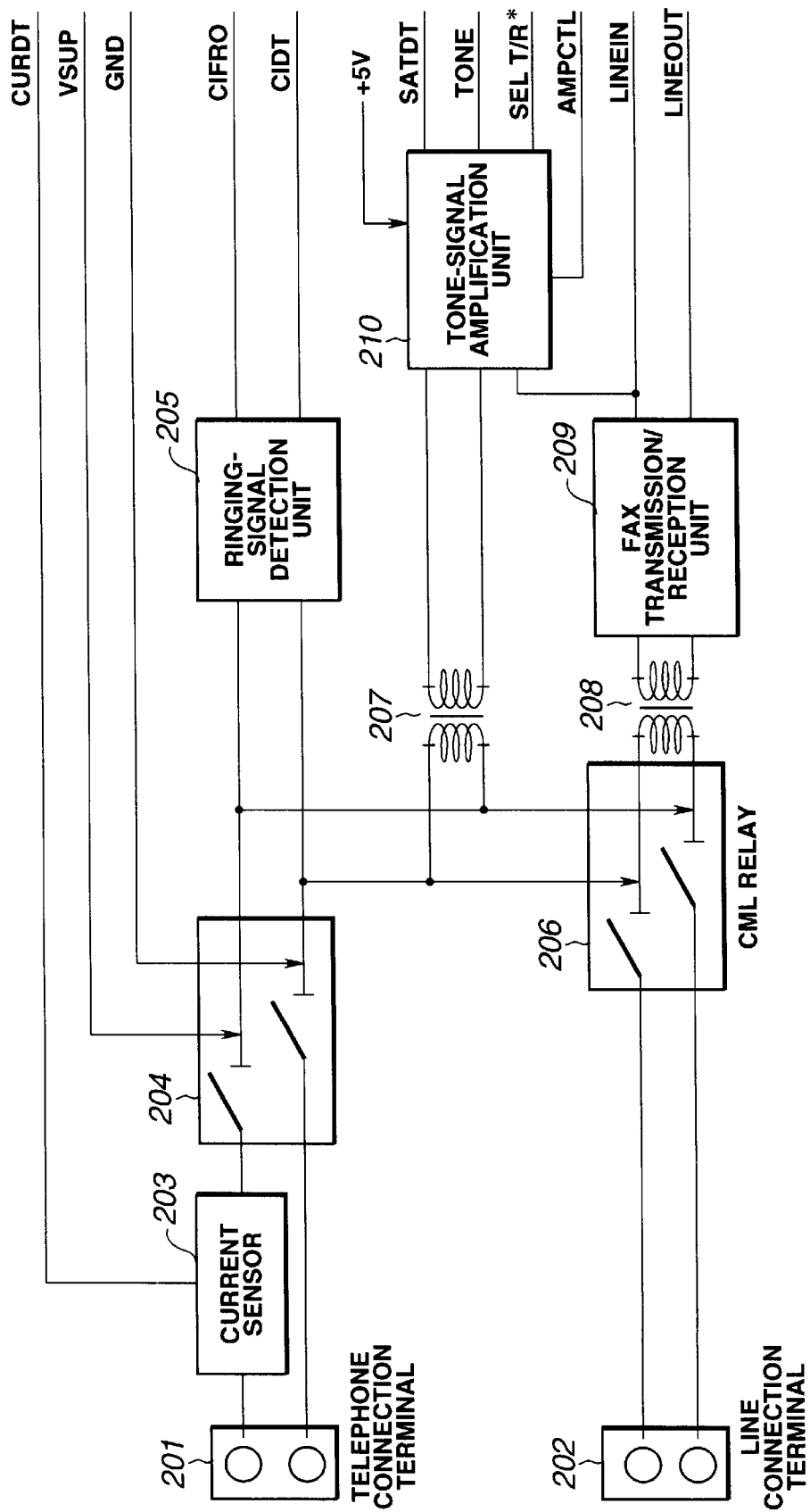
FIG. 2 is a block diagram illustrating the detailed configuration of a network control unit (NCU) shown in FIG. 1.

A network control unit (NCU) 107 is configured as shown in FIG. 2 (to be described in detail later), and connects a public telephone line 109 either to a telephone set 108 or to the modem unit 106 under the control of the main control unit 101. The NCU 107 also outputs a line-current detection signal CURDT indicating the hook state (i.e., on-hook or off-hook) of the telephone set 108, a tone-output-saturation detection signal SATDT of a tone-signal amplification unit 210, a ringing-signal detection signal CIDT from the telephone line, and the like to the main control unit 101. The main control unit 101 outputs a gain control signal AMPCTL and a tone-signal-input selection signal SEL T/R* to the NCU 107.

FIG. 2 is a block diagram illustrating the detailed configuration of the NCU 107.

In FIG. 2, a telephone connection terminal 201 connects the telephone set 108 to a side downstream from the facsimile apparatus. A line connection terminal 202 connects the facsimile apparatus to the public telephone line 109. A current sensor 203 detects the hook state of the telephone set 108 connected to the telephone connection terminal 201, and outputs a line-current detection signal CURDT to the main control unit 101. A relay 204 supplies a voltage for monitoring the hook state of the telephone set 108. A ringing-signal detection unit 205 detects a ringing signal from the line connection terminal 202 (the public telephone line 109), and outputs a ringing-signal detection signal CIDT and the frequency CIFRQ of the detected ringing signal to the main control unit 101. A CML (current-mode logic) relay 206 switches the connection of the telephone line 109 between the facsimile side and the telephone side. A high-impedance transformer 207 transmits a tone signal at the primary side from the telephone line 109 to the secondary side in a state of insulation between the primary side and the secondary side. A low-impedance transformer 208 transmits the tone signal at the primary side from the telephone line 109 to the secondary side. A facsimile transmission/reception unit 209 performs 2-line-to-4-line conversion of facsimile transmission/reception data. A reception signal line LINEIN and a transmission signal line LINEOUT of the facsimile transmission/reception unit 209 are connected to the modem unit 106. The tone-signal amplification unit 210 outputs a tone-output-saturation detection signal to the main control unit 101, outputs an amplified tone signal TONE to the modem unit 106, selects one of a tone signal from the high-impedance transformer 207 and a tone signal from the fascimile transmission/reception unit 209 in accordance with the tone-signal-input selection signal SEL T/R* from the main control unit 101, and changes the amplification gain in accordance with the gain control signal AMPCTL from the main control unit 101.

Figure 3:
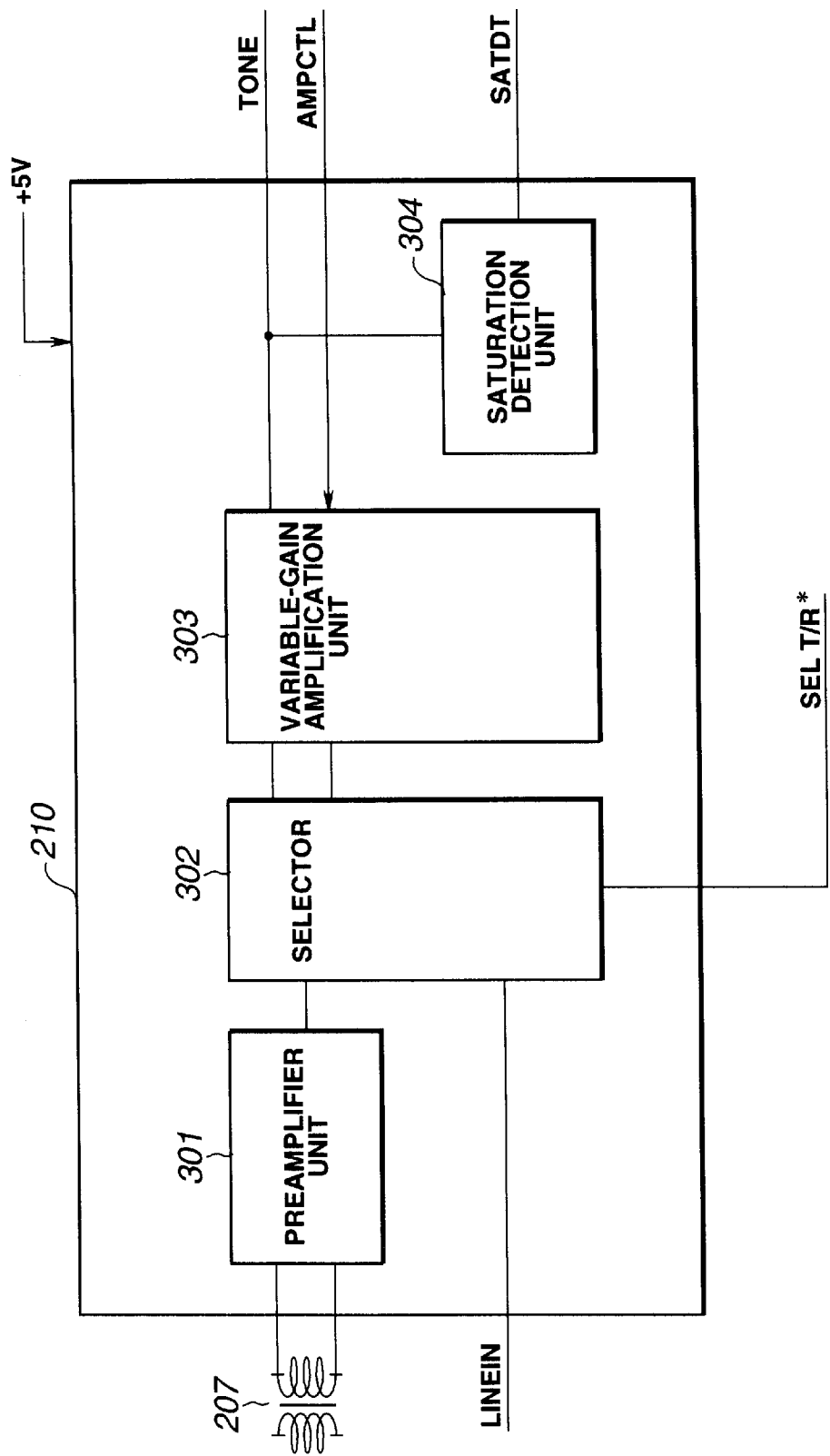
FIG. 3 is a block diagram illustrating the detailed configuration of a tone-signal amplification unit shown in FIG. 2 according to the first embodiment.

FIG. 3 is a block diagram illustrating the detailed configuration of the tone-signal amplification unit 210 according to a first embodiment of the present invention.

In FIG. 3, a preamplifier unit 301 amplifies the output of the high-impedance transformer 207 with a constant gain. A selector unit 302 selects one of the output of the high-impedance transformer 207 and the output of the low-impedance transformer 208 (the facsimile transmission/reception unit 209) as the input to a variable-gain amplification unit 303 in accordance with the tone-signal-input selection signal SEL T/R* from the main control unit 101. The variable-gain amplification unit 303 changes the gain in accordance with the input level, and changes the amplification degree in accordance with the gain control signal AMPCTL from the main control unit 101. A saturation detection unit 304 monitors the output signal of the preamplifier unit 302 to determine saturation of the output signal, and outputs a tone-output-saturation signal to the main control unit 101.

Figure 4:
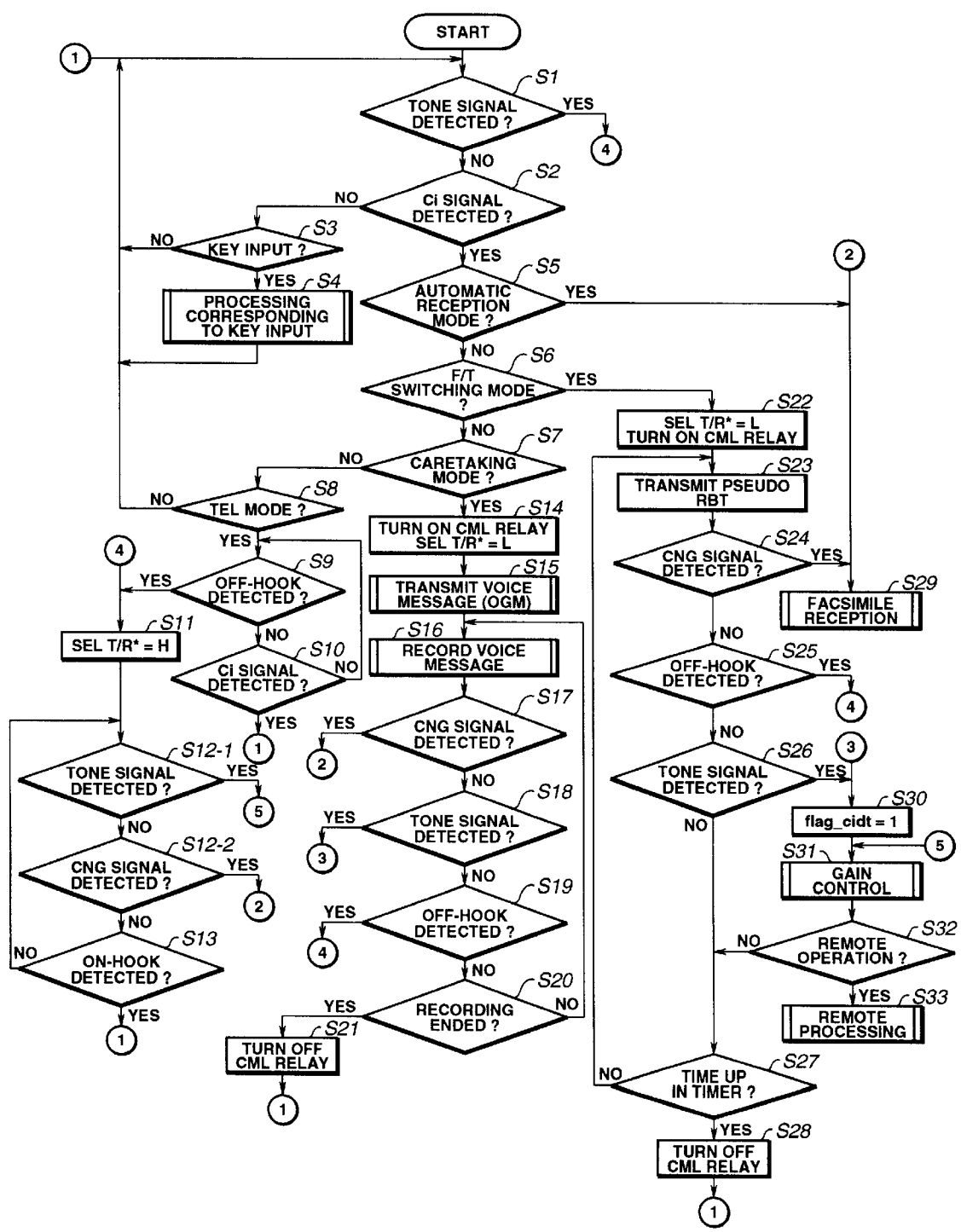
FIG. 4 is a flowchart illustrating the control operation of a main control unit shown in FIG. 1 in the first embodiment.

FIG. 4 is a flowchart illustrating the control operation of the main control unit 101 in the first embodiment. First, in steps S1, S2 and S3, detection of an off-hook state of the telephone set 108 is determined by a signal CURDT from the main control unit 101, detection of a ringing signal (Ci signal) from the telephone line 109 is determined by a signal CIDT from the ringing-signal detection unit 205, and the presence of a key input is determined, respectively. If the result of the determination in step S1 is affirmative, the process proceeds to step S11. If the result of the determination in step S2 is affirmative, the process proceeds to step S5. If the result of the determination in step S3 is affirmative, the process proceeds to step S4, where processing corresponding to the key input is performed.

If the result of the determination in step S2 is affirmative, it is then determined in steps S5, S6, S7 and S8 if the apparatus is set in an automatic reception mode, in a facsimile/telephone automatic switching mode, in a caretaking-telephone (answering machine) mode, and in a telephone mode, respectively. If the result of the determination in step S5 is affirmative, the process proceeds to step S29, where facsimile reception processing is executed by turning on the CML relay 206 (to connect the telephone line 109 to the low-impedance transformer 208).

If the result of the determination in step S6 is affirmative, the process proceeds to step S22, where the CML relay 206 is turned on to set a state of SEL T/R*=L ("0"). Then, in step S23, a pseudo ringback tone (RBT) is transmitted to the telephone line 109 by starting a timer T1 (35 seconds) and using a tone transmission function of the modem unit 106. Then, in steps S24, S25, S26 and S27, detection of a calling-tone (CNG) signal, detection of an off-hook state of the telephone set 108, detection of a tone signal from the telephone line 109, and the end of the time of the timer T1 are determined, respectively.

If the result of the determination in step S24 is affirmative, the process proceeds to step S29, where facsimile reception processing is executed. Upon completion of the facsimile reception processing, the process returns to a waiting state in step S1. If the result of the determination in step S25 is affirmative, the process proceeds to step S11. If the result of the determination in step S26 is affirmative, the process proceeds to step S30, where a flag flag_cidt within the RAM is set to 1. Then, in step S31, the processing of gain control of the tone-signal amplification unit 210 (to be described in detail later) is executed. Then, in step S32, it is determined if the detected tone signal (DTMF signal) requests a shift to a remote operation (for example, a tone signal representing "*" and "0"). If the result of the determination in step S32 is affirmative, the process proceeds to step S33, where processing (remote control of mode switching, for example, between the TEL mode and the automatic reception mode, remote control of recording and reproducing operations of a voice message, or the like) corresponding to a tone signal detected after setting SEL T/R*=L ("0") (selecting the input from the facsimile transmission/reception unit 209 as the input to the tone-signal amplification unit 210) is executed. Upon completion of execution of the remote control processing, the process returns to a waiting state in step S1. If the result of the determination in step S32 is negative, the process proceeds to step S27. If the result of the determination in step S27 is negative, the process returns to step S23. If the result of the determination in step S27 is affirmative, the process proceeds to step S28, where the CML relay 206 is turned off and the process returns to step S1.

If the result of the determination in step S7 is affirmative, the process proceeds to step S14, where the CML relay 206 is turned on to set SEL T/R*=L ("0"). Then, in step S15, a preset outgoing voice message (OGM) is transmitted to the telephone line 109. Upon completion of the transmission of the message OGM, in step S16, processing of recording a voice message from the telephone line 109 is started. Then, in steps S17, S18, S19 and S20, detection of a CNG signal, detection of a tone signal, detection of an off-hook state of the telephone set 108, and the end of the recording processing are determined, respectively. If the result of the determination in step S17 is affirmative, the process proceeds to step S29, where facsimile reception processing is performed. If the result of the determination in step S18 is affirmative, the process proceeds to step S30. If the result of the determination in step S19 is affirmative, the process proceeds to step S11. If the result of the determination in step S20 is affirmative, the process proceeds to step S21, where the CML relay 206 is turned off, and the process returns to step S1. If the result of the determination in step S20 is negative, the process returns to step S16, where processing of recording a voice message is executed, and the above-described determination processing of steps S17–S20 is repeatedly executed.

If the result of the determination in step S8 is affirmative, then, in steps S9 and S10, detection of an off-hook state of the telephone set 108, and the end of a ringing signal (Ci signal) from the telephone line 109 are determined, respectively. If the result of the determination in step S9 is affirmative, the process proceeds to step S11. If the result of the determination in step S10 is affirmative, the process returns to step S1.

In step S11, setting of SEL T/R*=H ("1") is performed (by selecting the input from the high-impedance transformer 207 as the input to the tone-signal amplification unit 210). Then, in steps S12-1, S12-2, and S13 detection of a tone signal, detection of a CNG signal, and detection of an on-hook state of the telephone set 108 are determined, respectively. If the result of the determination in step S12-1 is affirmative, the process proceeds to step S31. If the result of the determination in step S12-2 is affirmative, the process proceeds to step S29. If the result of the determination in step S13 is affirmative, the process returns to step S1.

Figure 5:
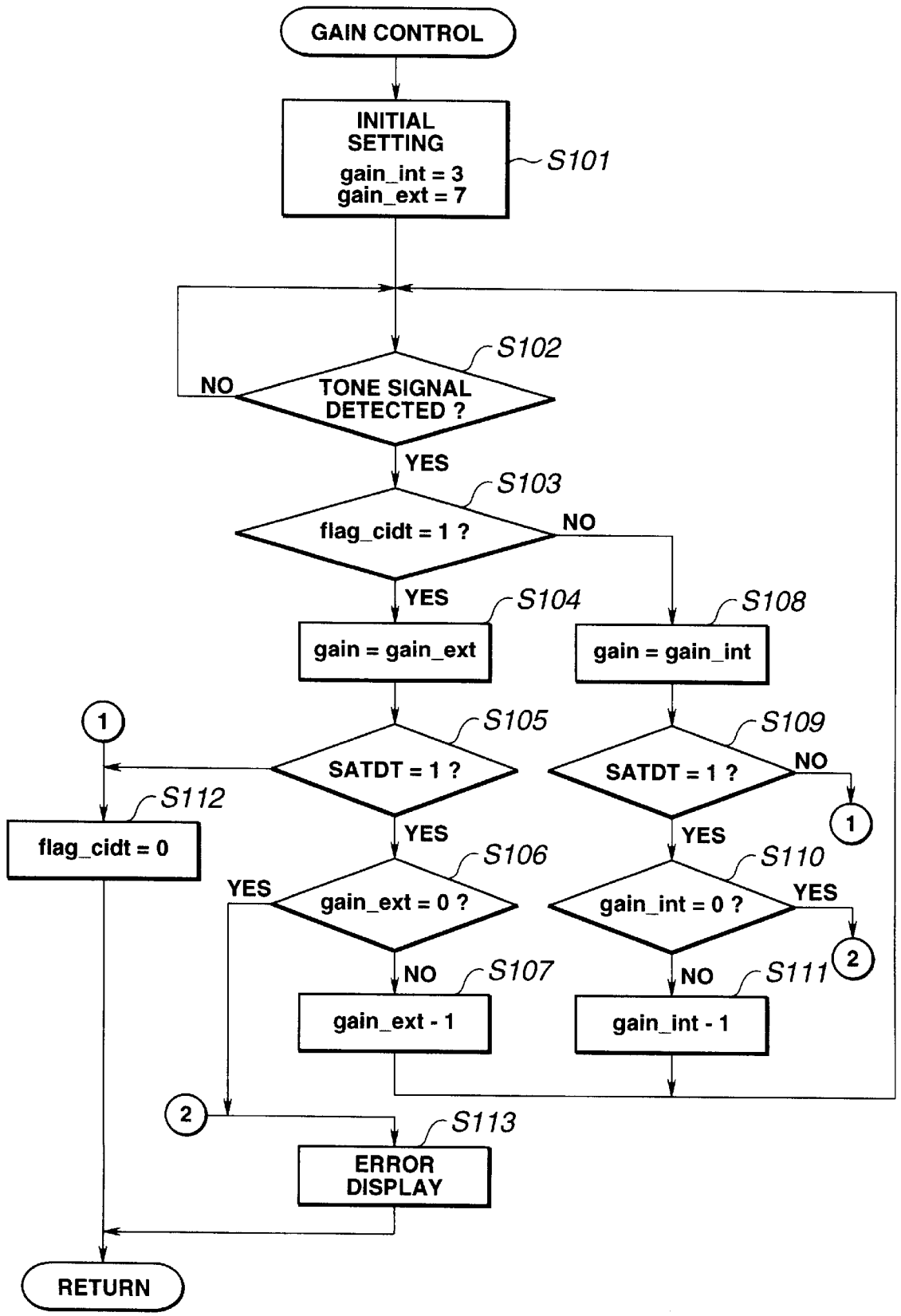
FIG. 5 is a flowchart illustrating gain control processing in the first embodiment.

FIG. 5 is a flowchart illustrating the detailed operation of the gain control processing shown in step S31 of FIG. 4.

The tone-signal amplification unit 210 shown in FIG. 3 can change the gain in seven steps, i.e., amplification degrees 0–7, according to a gain control signal AMPCTL from the main control unit 101. As the number of the amplification degree increases, a larger gain is obtained.

The power supply of the tone-signal amplification unit 210 has a voltage of +5 V. The signal after amplification is output within a range of about 3.5 V p-p. The amplification degree of the tone-signal amplification unit 210 can be controlled independently from an external remote control terminal and by an operation through the telephone set 108 connected to the telephone connection terminal 201. The setting of the gain in an off-hook state is indicated by gain_int, and the setting of the gain in an on-hook state is indicated by gain_ext. The values of gain_int and gain_ext are selectively substituted in the gain. A gain control signal AMPCTL is output in accordance with the selected value to control the amplification degree of the tone-signal amplification unit 210.

In step S101 of FIG. 5, gain_int=3 and gain_ext=7 are set as initial setting values of the gain. In step S102, detection of a tone signal is determined. If the result of the determination in step S102 is affirmative, the process proceeds to step S103, where it is determined if the value of the flag flag_cidt equals "1", (flag_cidt=1). If the result of the determination in step S103 is negative, the process proceeds to step S108, where the value of gain_int is set as the value of the gain to be set in the gain control signal AMPCTL, and the signal AMPCTL is output to the tone-signal amplification unit 210. It is then determined in step S109 if the value of a tone-output-saturation detection signal SATDT equals "1" (if saturation of the tone output is detected). If the result of the determination in step S109 is negative (if saturation of the tone output is not detected), the process proceeds to step S112, where the flag flag_cidt is reset (the flag flag_cidt is set to "0"), and the process proceeds to step S32 shown in FIG. 4. If the result of the determination in step S109 is affirmative (if saturation of the tone output is detected), the process proceeds to step S110, where it is determined if the value of gain_int equals "0". If the result of the determination in step S110 is negative, the process proceeds to step S111, where the value of gain_int is decremented by one, and the process returns to step S102. If the result of the determination in step S110 is affirmative, the process proceeds to step S113, where an error display indicating that the tone signal cannot be detected is performed on the display device of the operation unit 105, and the process proceeds to step S32 shown in FIG. 4.

If the result of the determination in step S103 is affirmative, the process proceeds to step S104, where the value of gain_ext is set as the value to be set in the gain control signal AMPCTL, and the signal AMPCTL is output to the tone-signal amplification unit 210. It is then determined in step S105 if the value of the signal SATDT equals "1" (if saturation of the tone output is detected). If the result of the determination in step S105 is negative, the process proceeds to step S112. If the result of the determination in step S105 is affirmative, the process proceeds to step S106, where it is determined if the value of gain_ext equals "0". If the result of the determination in step S106 is affirmative, the process proceeds to step S113, where error display is performed. If the result of the determination in step S106 is negative, the process proceeds to step S107, where the value of gain_ext is decremented by one, and the process returns to step S102.

According to the above-described processing, when the telephone line 109 is connected to the telephone set 108, and the telephone set 108 is in an off-hook state, the input from the high-impedance transformer 207 is selected as the input to the tone-signal amplification unit 210, gain_int=3 is output to the variable-gain amplification unit 303 as the value of the initial gain control signal AMPCTL, and the tone signal from the telephone set 108 is mainly amplified with a low amplification degree. On the other hand, when the telephone line 109 is connected to the facsimile transmission/reception unit 209, the input from the facsimile transmission/reception unit 209 is selected as the input to the tone-signal amplification unit 210, gain_ext=7 is output to the variable-gain amplification unit 303 as the value of the initial gain control signal AMPCTL, and the tone signal from the telephone line 109 is mainly amplified with a high amplification degree. When the tone output from the tone-signal amplification unit 210 is saturated, the value of the gain is reduced by one step.

In the foregoing embodiment, a description has been provided of a case in which the function of a caretaking telephone (answering-machine function) is incorporated within the facsimile apparatus, and an ordinary telephone set is connected to the telephone connection terminal 201 (see FIG. 2). However, a caretaking telephone may be connected to the telephone connection terminal 201. In this case, in the facsimile apparatus, it is determined in step S7 shown in FIG. 4 if the apparatus is set in a caretaking-telephone connection mode. If the result of the determination is affirmative, detection of a response of the caretaking telephone (an off-hook state) and the end of a Ci signal are first determined instead of the processing of steps S14–S21. When the Ci signal has ended, the process returns to step S1. When an off-hook state has been detected, setting of SEL T/R*=H ("1") is performed, and detection of a CNG signal, detection of a tone signal, and detection of the end of the operation of the caretaking telephone (an on-hook state) are repeatedly determined. When a CNG signal has been detected, the process proceeds to step S29. When a tone signal has been detected, the process proceeds to step S30. When an on-hook state has been detected, the process returns to step S1.

As described above, in the caretaking-telephone connection mode, the input from the high-impedance transformer 207 is selected as the input to the tone-signal amplification unit 210, gain_ext=7 is set as the value of the initial gain of the gain control signal AMPCTL, and the tone signal is amplified. When a tone signal has been detected and the detected tone signal represents a request to shift to the remote operation mode from the telephone line 109, in step S33, remote processing is executed after turning on the CML relay 206, and performing setting of SEL T/R*=L ("0"). When the detected tone signal is from the caretaking telephone (when the operator has responded and remote instruction to start facsimile reception processing is performed from the caretaking telephone), the tone signal can be appropriately detected when the value of gain_ext is decremented by one and saturation of the tone output of the amplification unit is dissolved, and the remote processing of step S33 is executed in the state of SEL T/R*=H ("1").

Although in the above-described first embodiment, the amplification gain is changed using the variable-gain amplification unit 303, a plurality of amplification units having different amplification degrees may be provided in order to obtain an appropriate output. A description will now be provided of such a case as a second embodiment of the present invention.

Figure 6:
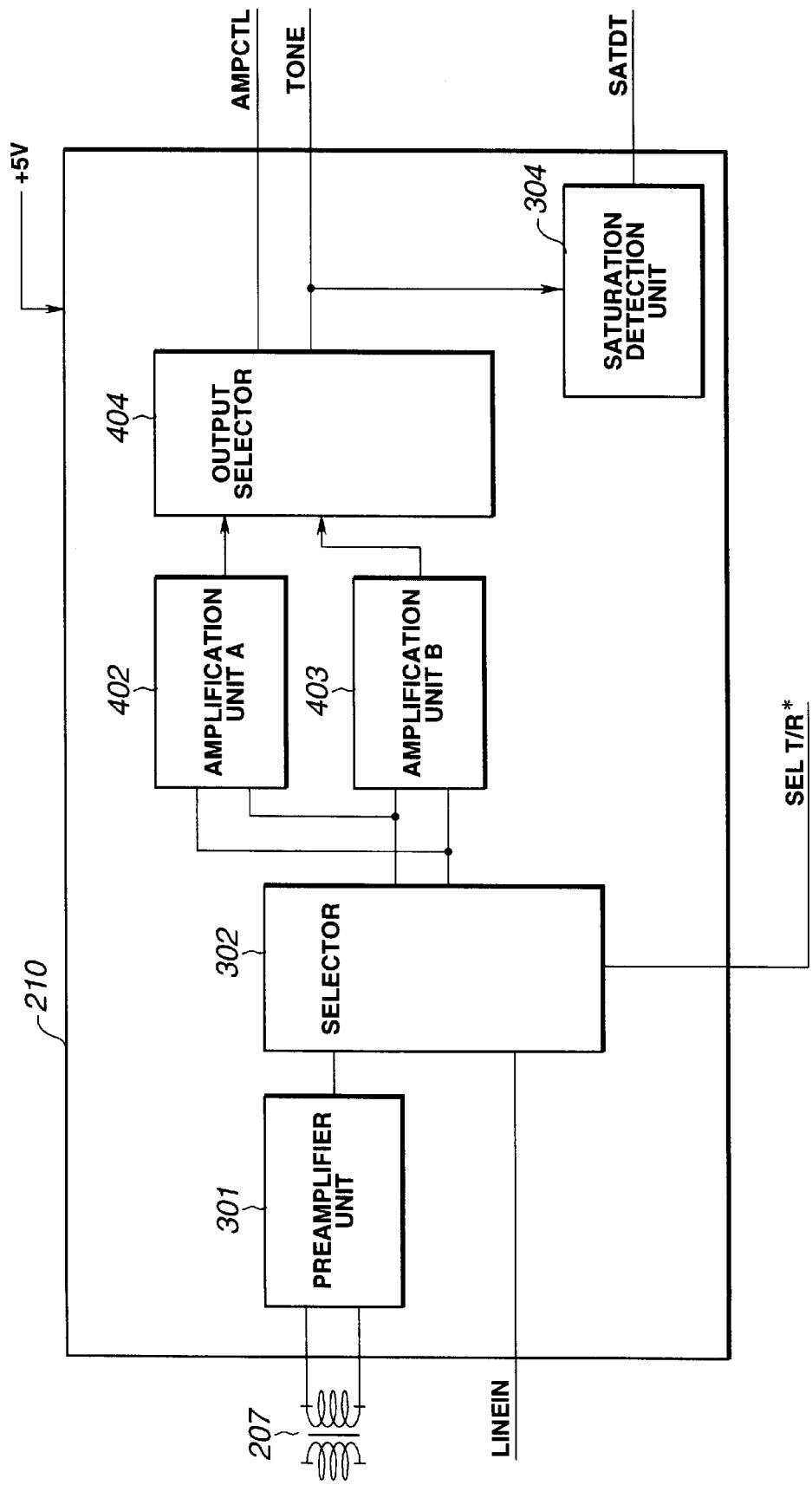
FIG. 6 is a block diagram illustrating the detailed configuration of the tone-signal amplification unit according to the second embodiment.

FIG. 6 is a block diagram illustrating the detailed configuration of the tone-signal amplification unit 210 according to the second embodiment.

In FIG. 6, the same reference numerals as those in FIG. 3 represent the same components, and therefore a description thereof will be omitted.

In FIG. 6, reference numeral 402 represents a signal amplification unit A having an amplification degree of gain (A). Reference numeral 403 represents a signal amplification unit B having an amplification degree of gain (B). An output selector unit 404 switches between the output signal of the amplification unit A and the output signal of the amplification unit B by an AMPCTL signal, and outputs the selected signal as a tone signal.

The tone-signal amplification unit 210 shown in FIG. 6 can change the gain in two stages, i.e., the amplification degrees A (large) and B (small) by an AMPCTR signal from the main control unit 101. The tone-signal amplification unit 210 includes the amplification unit A 402 having the amplification degree A and the amplification unit B 403 having the amplification degree B. Each of these units amplifies an input signal and outputs the amplified signal. The outputs from the amplification units A and B are input to the selector unit 404, which selects the output of the amplification unit B when AMPCTL=L ("0"), selects the output of the amplification unit A when AMPCTL=H ("1"), and outputs the selected signal as a tone signal.

The power supply of the tone-signal amplification unit 210 has a voltage of +5 V. The signal after amplification is output within a range of about 3.5 V p-p. The amplification degree of the tone-signal amplification unit 210 can be controlled independently from an external remote control terminal and by an operation through the telephone set 108 connected to the telephone connection terminal 201. Setting of the gain in an off-hook state is indicated by gain_int, and setting of the gain in an on-hook state is indicated by gain_ext. The values of gain_int and gain_ext are reflected on the AMPCTL signal in accordance with the value selectively substituted in the gain to control the amplification degree of the tone-signal amplification unit 210. The amplification degrees A and B are selected when the value of gain equals 1 and 0, respectively.

Figure 7:
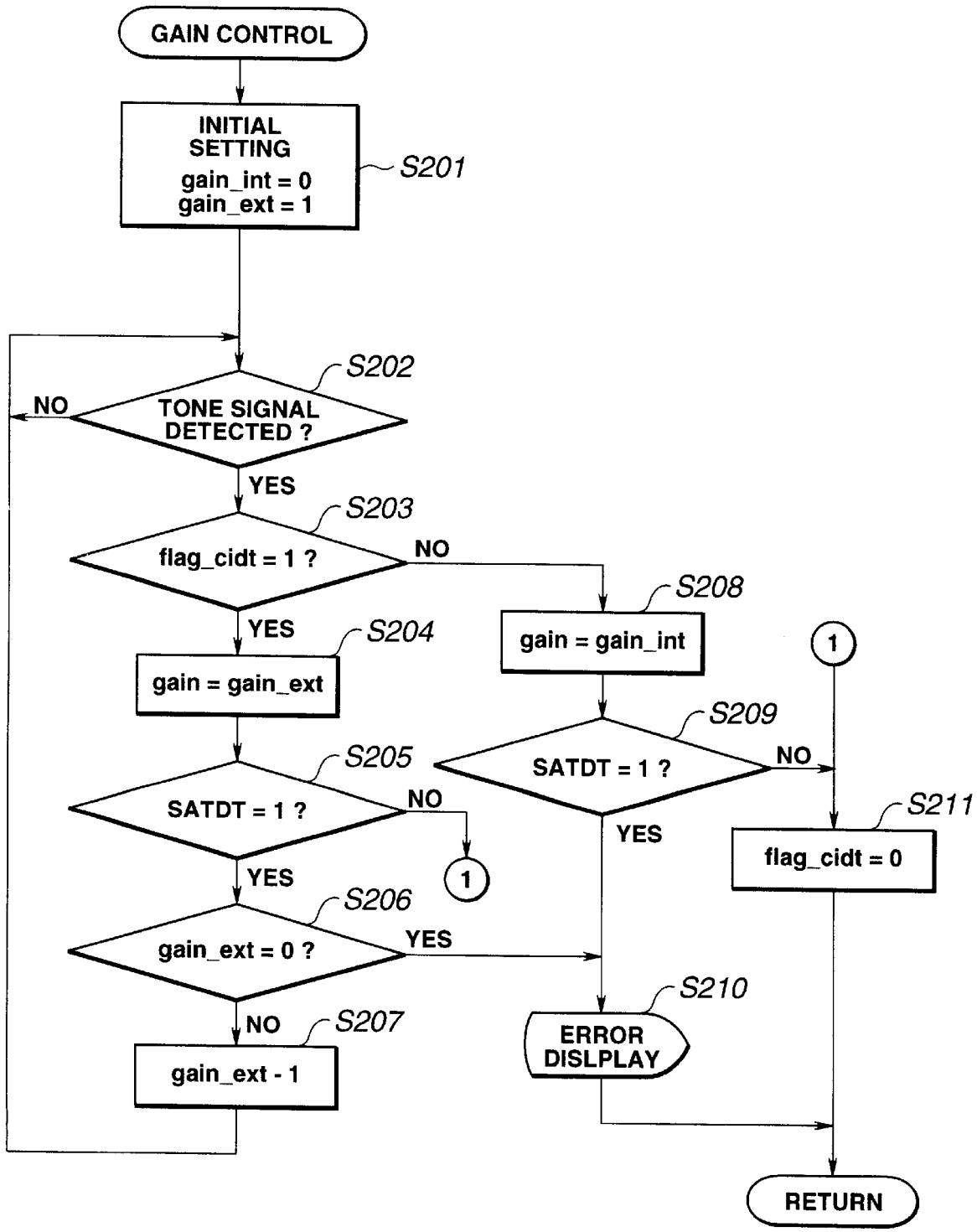
FIG. 7 is a flowchart illustrating gain control processing in the second embodiment.

FIG. 7 is a flowchart illustrating gain control processing by the main control unit 101 in the second embodiment. The processing of the second embodiment differs from the processing of the first embodiment only in gain control processing in step S31 in the flowchart shown in FIG. 3.

In step S201, initial setting of the gain is performed such that gain_int=0, and gain_ext=1. In step S202, detection of a tone signal is determined. If the result of the determination is affirmative, the process proceeds to step S203, where it is determined if the value of flag_cidt equals "1". If the result of the determination in step S203 is affirmative, the process proceeds to step S204, where the value of gain_ext is set as the value of the gain of the gain control signal AMPCTL, and the signal AMPCTL is output to the output selector 404 of the tone-signal amplification unit 201. In step S205, it is determined if SATDT=1 (if the tone output is saturated). If the result of the determination in step S205 is negative, the process proceeds to step S211, where the flag flag_cidt is reset, and the process proceeds to step S32 shown in FIG. 3. If the result of the determination in step S205 is affirmative, the process proceeds to step S206, where it is determined if the value of gain_ext equals "1". If the result of the determination in step S206 is affirmative, the process proceeds to step S210, where the same error display as in step S113 shown in FIG. 5 is performed, and the process proceeds to step S32 shown in FIG. 3. If the result of the determination in step S206 is negative, the process proceeds to step S207, where the value of gain_ext is decremented by one, and the process returns to step S202.

If the result of the determination in step S203 is negative, the process proceeds to step S208, where the value of gain_int is set as the value of the gain of the gain control signal AMPCTL, and outputs the set value to the output selector 404. In step S209, it is determined if the value of SATDT equals "1". If the result of the determination in step S209 is negative, the process proceeds to step S211. If the result of the determination in step S209 is affirmative, the process proceeds to step S212.

Processing in the caretaking telephone connection mode in the second embodiment is the same as in the first embodiment.

In the above-described first and second embodiments, the gain may be switched by detection of saturation of the tone output from the tone-signal amplification unit 201 in the remote processing in step S33 shown in FIG. 3.

Figure 8:
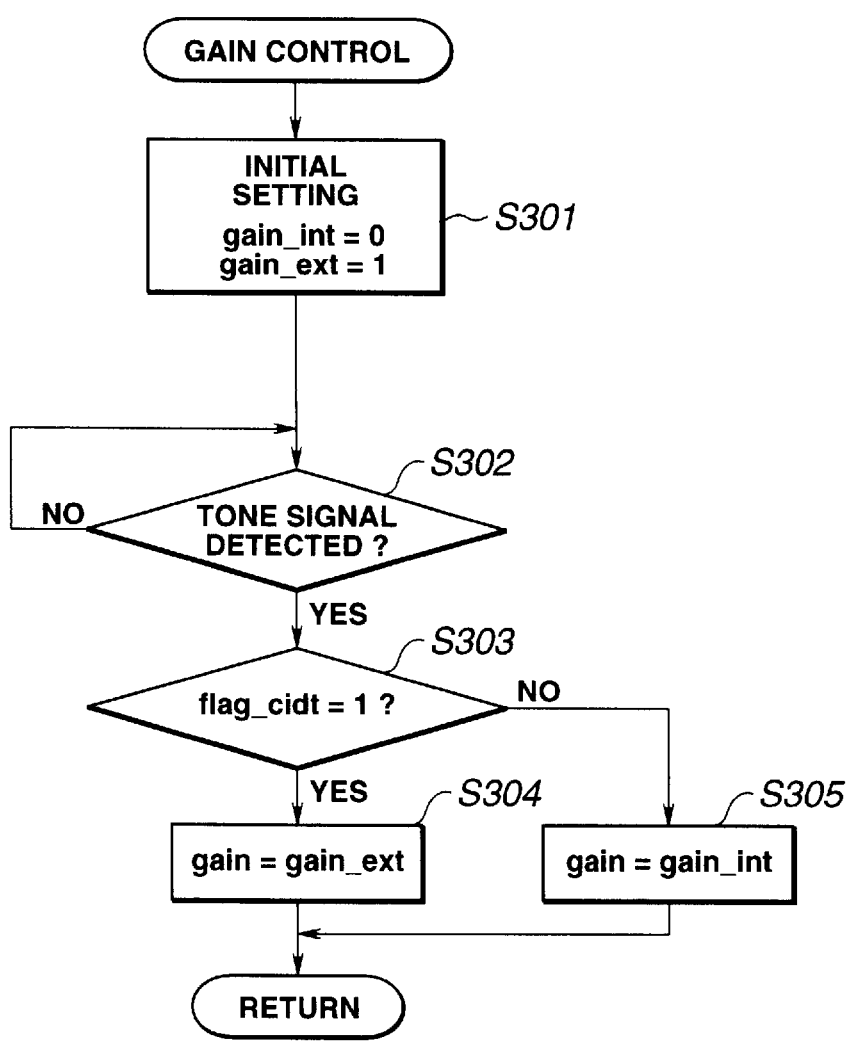
FIG. 8 is a flowchart illustrating gain control processing according to a modification of the second embodiment.

In the second embodiment, as in the flow shown in FIG. 8, detection of saturation of the tone output may not be performed, and, instead, one of the amplification units A and B may be selected.

In the first and second embodiments, the initial values of gain__int and gain__ext may be arbitrarily set by a key input from the operation unit 105.

The initial setting value of the gain of the tone-signal amplification unit 201 may be automatically changed by the main control unit 101 in accordance with detection of saturation of the tone output.

Although in FIG. 2 the high-impedance transformer 207 is used as primary-side/secondary side separation means, a tone signal may be extracted using a Hall element or the like.

The present invention can be applied not only to a facsimile apparatus, but also to any data communication apparatus or other communication apparatus, such as a caretaking telephone or the like, in which a remote operation can be performed by remote control signals (having different signal levels) from a near terminal, such as a telephone set, or the like, and a remote terminal, such as a telephone set or the like, via a network.

The individual components designated by blocks in the drawings are all well known in the communication apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication apparatus capable of being controlled by a first remote control signal from a near terminal and by a second remote control signal from a remote terminal, said apparatus comprising:

amplifier means for amplifying a received signal in accordance with an amplification degree to provide an amplified signal, the amplification degree of said amplifier means being controllable;

first detection means for detecting a remote control signal on the basis of the amplified signal amplified by said amplifier means;

second detection means responsive to said first detection means for detecting whether said apparatus is in a first state of receiving the first remote control signal from the near terminal or in a second state of receiving the second remote control signal from the remote terminal; and control means for controlling the amplification degree of said amplifier means in accordance with a result of detection by said second detection means.

2. A communication apparatus according to claim 1, wherein said amplifier means comprises a variable-gain amplifier unit, and wherein said control means controls a gain of said variable-gain amplifier unit.

3. A communication apparatus according to claim 1, wherein said amplifier means comprises at least a first amplifier and a second amplifier, and wherein said control means selects one of said first and second amplifiers of said amplifier means.

4. A communication apparatus according to claim 1, wherein said second detection means detects whether or not the near terminal is in an operating state.

5. A communication apparatus according to claim 4, wherein said second detection means detects whether or not the near terminal is in an off-hook state.

6. A communication apparatus according to claim 1, further comprising third detection means for detecting whether or not an output of said amplifier means is saturated, wherein said control means controls the amplification degree of said amplifier means in accordance with a result of detection by said third detection means.

7. A communication apparatus according to claim 1, wherein the remote control signal detected by said first detection means comprises a predetermined tone signal.

8. A communication apparatus according to claim 7, wherein the remote control signal detected by said first detection means comprises a predetermined dual-tone multi-frequency signal.

9. A communication apparatus according to claim 1, wherein the remote control signal from the remote terminal is received through a communication line of a communication network.

10. A communication apparatus according to claim 9, further comprising communication means for performing a communication operation, and switching means for selectively connecting the communication line to one of said communication means and the near terminal.

11. A communication apparatus according to claim 10, wherein said communication means performs facsimile communication, and wherein said control means causes said communication means to perform facsimile communication in accordance with the remote control signal detected by said first detection means.

12. A communication apparatus according to claim 10, wherein said communication means performs voice message communication, and wherein said control means causes said communication means to perform voice message communication in accordance with the remote control signal detected by said first detection means.

* * * * *

UNITED STATES PATENT AND TRADEMARK OFFICE
CERTIFICATE OF CORRECTION

PATENT NO. : 5,822,407
DATED : October 13, 1998
INVENTOR(S) : ATSUSHI OHTANI

It is certified that error appears in the above-identified patent and that said Letters Patent is hereby corrected as shown below:

<u>COLUMN 8</u>

Line 56, "equals "1"." should read --equals "0".--

Signed and Sealed this

Twenty-second Day of June, 1999

Attest:

Q. TODD DICKINSON

*Attesting Officer*     *Acting Commissioner of Patents and Trademarks*